Patented June 27, 1950

2,512,630

UNITED STATES PATENT OFFICE 2,512,630

POLYMERIC COMPOSITIONS

James Wotherspoon Fisher, Harold Bates, and Edward William Wheatley, Spondon, near Derby, England, assignors to Celanese Corporation of America, a corporation of Delaware No Drawing. Application July 2, 1948, Serial No. 36,818. In Great Britain August 12, 1947

6 Claims. (Cl. 260—13)

This invention relates to improvements in polymeric materials.

It is well known that a number of fibre-forming or film-forming polymers, for example cellulose acetate, cellulose aceto-butyrate, cellulose butyrate, cellulose aceto-stearate, ethyl cellulose, oxyethyl cellulose, oxyethyl cellulose acetate, benzyl cellulose and various other cellulose derivatives, various polyvinyl compounds such as polyvinyl chloride-acetate, polymethyl methacrylate and polymethyl acrylate, have little or no affinity for acid wool colours but have a good affinity for the dispersed insoluble type of dyestuff now generally applied to cellulose acetate.

U. S. application S. No. 609,031 filed August 4, 1945 describes the production of nitrogen-containing polymers from dihydrozides of dicarboxylic acids in presence of hydrazine, e. g. 10% by weight of the dihydrazide, over and above that combined in the dihydrazide and also describes using dicarboxylic esters with an amount of hydrazine in excess of two moles for each mole of dicarboxylic ester. U. S. application S. No. 662,628 filed April 16, 1946 describes the production of such polymers from hydrazine and the dicarboxylic acids themselves or their anhydrides, again using more than two moles of hydrazine. Polymers may be produced according to the processes of the specifications which possess characteristics, including resistance to degenerative hydrolysis by boiling hydrochloric acid, indicating that they contain the 4-amino-1.2.4-triazole nucleus repeated along the main polymer chain. These polymers will be referred to in the present specification as poly-4-amino-1.2.4-triazoles.

As described in the said specifications, the polymeric materials may be of sufficiently high molecular weight to render them capable of being formed into films, filaments or like products, for example by melt spinning or by wet or dry spinning processes.

In U. S. application S. No. 784,306 filed November 5, 1947, we have described processes for acylating the polyaminotriazoles, including treatments with acetylating agents or with formic acid reacted, for example, at water-bath temperature. According to the present invention, filaments, films and the like are made from compositions comprising both a saponifiable cellulose ester which has little or no affinity for acid wool colours and a poly-4-aminotriazole acylated with a mono-functional acylating agent.

The filaments, films and like materials may be made from a solution in a common solvent of the two types of polymer. In some cases it may be found that the two types of polymer are not both soluble in a solvent of the type which it is desired to use in wet or dry spinning processes. In such a case the two types of polymer, for example cellulose acetate and acylated poly-4-amino-1.2.4-triazole may be dissolved in a common solvent, the solution precipitated and then the precipitate taken up in the desired solvent. Thus, for example, cellulose acetate may first be dissolved in cold formic acid, separately a poly-4-amino-1.2.4-triazole is dissolved in hot formic acid, the two solutions are then mixed and poured into excess water. The mixed polymers, precipitated and washed, may then be dissolved in acetone to form a viscous emulsified dope which can quite readily be filtered and used for dry spinning operations.

The acylated polytriazoles do not themselves confer upon the cellulose acetate or other saponifiable cellulose ester an affinity for acid wool colours or do not confer a high affinity. Nevertheless, filaments or other materials made from the two types of polymer can be after-treated with caustic soda or other hydrolysing agent, so as to produce filaments which have a good affinity for acid wool colours. The treatment may saponify the cellulose ester sufficiently to yield a product which has an affinity for direct cotton colours and vat colours as well as for the acid wool colours, and moreover, if the saponification of the cellulose ester is only partial, affinity for the dispersed insoluble dyestuffs may be retained.

The following example illustrates the invention:

10 parts by weight of cellulose acetate linters were dissolved in cold formic acid and to this solution was added another solution made by dissolving 1 part of poly-4-amino-octamethylene-1.2.4-triazole (from sebacic dihydrazide and hydrazine as described in U. S. application S. No. 609,031) in hot formic acid and refluxing as described in U. S. application S. No. 784,306. The solutions were then well stirred together and poured into excess water. The polymers were precipitated as a white fibrous mass which was thoroughly washed and dried. The product was then dissolved in 38 parts of acetone to give a dope which was of even consistency and which filtered unchanged. The dope was then spun by ordinary dry spinning methods. The resulting yarn was immersed in 4% aqueous caustic soda for 3 minutes at 50–60° C. and carefully rinsed free from alkali. It showed a good affinity for acid wool colours, such as Naphthalene Scarlet BS, Azo Geranine 2GS, Brilliant Acid Blue R, Solway Green GS and Azo Acid Black 3BL; for the dispersed insoluble type of dyestuff normally applied to cellulose acetate; for the soluble colours which normally have affinity for cellulose acetate, such as Solacet Fast Scarlet BS and Solway Ultra Blue BS; and for cotton colours, such as Sky Blue FF.

Other hydrolysing agents which may be used instead of caustic soda include caustic potash, tri-sodium phosphate and strong organic bases such as methylamine, ethylene diamine, and the quaternary ammonium hydroxides.

Having described our invention, what we desire to secure by Letters Patent is:

1. Articles comprising essentially a monocarboxylic acid ester of cellulose which is saponifiable by alkaline reagents and containing a polymer having in its structural unit an acylated 4-amino-1.2.4-triazole group, the acyl group of which is that of a monocarboxylic acid.

2. Articles comprising essentially cellulose acetate and containing a polymer having in its structural unit an acylated 4-amino-1.2.4-triazole group, the acyl group of which is that of a monocarboxylic acid.

3. Articles comprising essentially cellulose acetate and containing a polymer having in its structural unit a formylated 4-amino-1.2.4-triazole group.

4. Process for the manufacture of products having an affinity for acid wool colors, which comprises saponifying by means of alkaline reagents articles comprising essentially a monocarboxylic acid ester of cellulose which is saponifiable by alkaline reagents and containing a polymer having in its structural unit an acylated 4-amino-1.2.4-triazole group, the acyl group of which is that of a monocarboxylic acid.

5. Process for the manufacture of products having an affinity for acid wool colors, which comprises saponifying by means of alkaline reagents articles comprising essentially cellulose acetate and containing a polymer having in its structural unit an acylated 4-amino-1.2.4-triazole group, the acyl group of which is that of a monocarboxylic acid.

6. Process for the manufacture of products having an affinity for acid wool colors, which comprises saponifying with alkaline reagents articles comprising essentially cellulose acetate and containing a polymer having in its structural unit an acylated 4-amino-1.2.4-triazole group, the acyl group of which is that of a monocarboxylic acid, said saponification being partial so as to confer an affinity for cotton colors but insufficient to remove affinity for the dispersed insoluble cellulose acetate colors.

JAMES WOTHERSPOON FISHER.
HAROLD BATES.
EDWARD WILLIAM WHEATLEY.

REFERENCES CITED

The following references are of record in the file of this patent:

UNITED STATES PATENTS

| Number | Name | Date |
|---|---|---|
| 2,395,642 | Prichard | Feb. 26, 1946 |